United States Patent [19]
Finkelstein

[11] Patent Number: 5,544,474
[45] Date of Patent: Aug. 13, 1996

[54] SYSTEM FOR HARVESTING CROP ITEMS AND CROP HARVESTING TOOLS USED THEREWITH

[76] Inventor: Zvi Finkelstein, 16 Ha'Gefen, Aseret 76858, Israel

[21] Appl. No.: 391,988

[22] Filed: Feb. 21, 1995

[51] Int. Cl.$^6$ .................................................. A01D 46/24
[52] U.S. Cl. ................................. 56/10.2 A; 56/10.2 F; 56/10.2 R
[58] Field of Search ............................ 56/10.2 A, 10.2 F, 56/10.2 R, 10.1, DIG. 15; 901/2

[56] References Cited

U.S. PATENT DOCUMENTS

| 4,519,193 | 5/1985 | Yoshida et al. | 56/328.1 |
| 4,532,757 | 8/1985 | Tutle | 56/10.2 A X |
| 4,975,016 | 12/1990 | Pellenc et al. | 56/328.1 X |

*Primary Examiner*—Terry Lee Melius
*Attorney, Agent, or Firm*—Mark M. Friedman

[57] ABSTRACT

A system for executing a farming activity on a working area including one or more growing areas of crop items and harvesting tools and manipulators for harvesting crop items hanging by stems from their growth sources. The system includes a track extending substantially parallel to and in a spaced relationship from one or more of the growing areas of crops and a trolley driven along the track, the trolley including farm equipment for executing a farming activity on the growing areas of crops. One embodiment of a harvesting tool includes a base and a cutterhead mounted on the base, the cutterhead having (i) an array of fingers for accommodating the stem between a pair of adjacent fingers, the array having a substantially arcuate configuration and dimensioned so as to envelop at least the top portion of the crop item and (ii) a stem cutter for cutting the stem when accommodated by a pair of adjacent fingers. Another embodiment of a harvesting tool includes a manipulator for selectively harvesting the crop item, the manipulator detaching the crop item from its growth source during a displacement from an extended position in which it grips the crop item at its growth source to an retracted position and a stabilizer for stabilizing the growth source while the crop item is being harvested therefrom, the stabilizer assuming a growth source engaging position before the manipulator is displaced from its extended position to its retracted position.

19 Claims, 14 Drawing Sheets

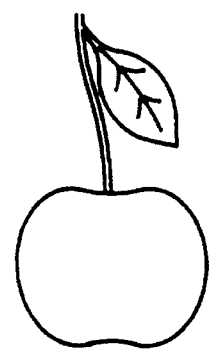
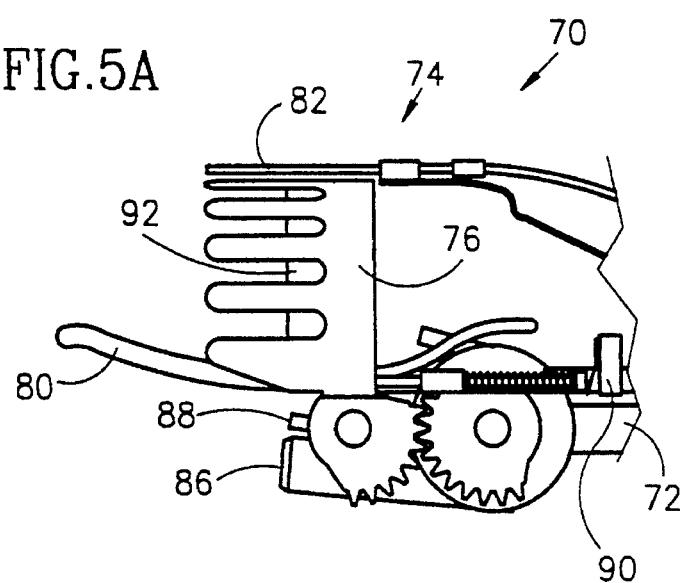
FIG.5A
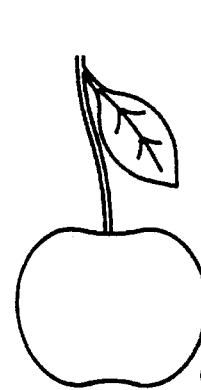
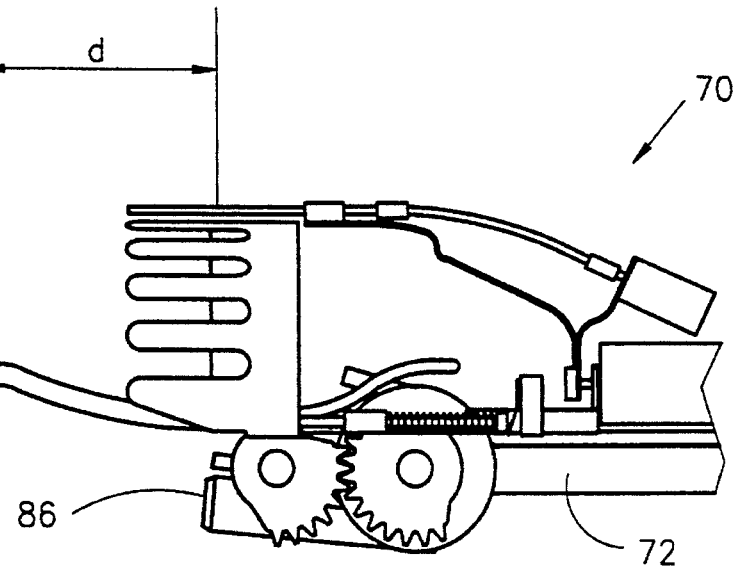
FIG.5B
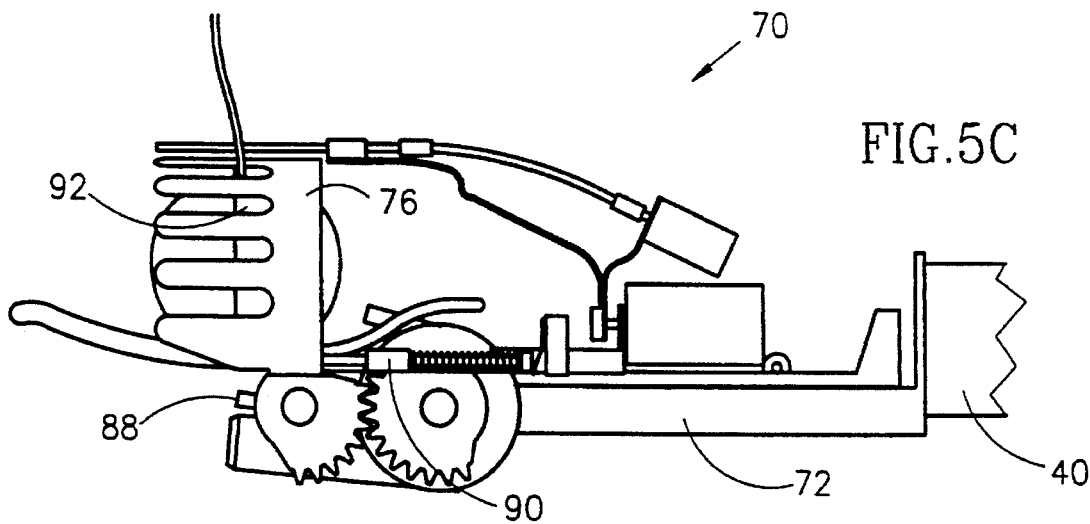
FIG.5C

SYSTEM FOR HARVESTING CROP ITEMS AND CROP HARVESTING TOOLS USED THEREWITH

FIELD AND BACKGROUND OF THE INVENTION

The present invention relates to automatically guided tractors, trolleys, and the like, for pursuing a pre-determined path through growth sources of crop items in general. Furthermore, the present invention relates to crop harvesting tools and manipulators for harvesting crop items hanging by stems from their growth sources.

The advantages of tending and in particular harvesting crop items using automatically guided tractors, trolleys and the like are well known and have encouraged the development of a number of such systems to achieve the same. Such advantages include greater equipment utilization, higher outputs for any given equipment base, less reliance on scarce and expensive manual labor, and the like.

For example, U.S. Pat. No. 4,482,960 to Pryor entitled "Robot Tractors" describes an electro-optical and microcomputer based method and apparatus for automatically guiding tractors and other farm machinery for the purpose of automatic crop planting, tending and harvesting. In particular, a farm tractor is guided by a microprocessor which receives information from a solid state TV camera mounted at the front of the tractor for viewing ahead of and to one side of the tractor. Optionally or alternatively, a second camera can be located at a high area at the edge of the field to track the tractor and provide an external reference frame for its operation.

This system suffers from a number of disadvantages. First, that the communication between the tractor and the microprocessor can be distorted by the growth sources therebetween, thereby interfering with the operation of the system. And second, that safety measures are required to ensure that the tractor does not "run away" from its pre-determined working area. These safety measures can be implemented as bumper type limit switches to physically shut off the tractor if the bumper comes in contact with an object, cables or laser beams delineating the working area of the tractor, and the like.

Turning now to the harvesting of crop items hanging by stems from growth sources, it is well known that practically every kind of tree or bush grown crop item, be it a fruit or vegetable, should be picked such that the stem remains attached to the body of the crop item. This is true when a crop item is picked in a unripe condition because proper ripening will only occur if the stem remains attached to the body of the crop item. And this is also true when the crop item is picked in a ripe state ready for immediate consumption because the stem denies access to the pulp of the fruit by oxygen, bacteria, insects and the like.

Several harvesting tools and manipulators have been suggested in the prior art. These include the mechanical hand and intake head described in U.S. Pat. No. 4,975,016 to Pellens et al, the robot hand described in U.S. Pat. No. 4,663,925 to Terada, the fruit picking device described in U.S. Pat. No. 5,005,347 to Kedem et al., the harvesting hand described in U.S. Pat. No. 4,718,223 to Suzuki et al., the robotic fruit harvester described in U.S. Pat. No. 4,532,757 to Tutle, the fruit harvesting apparatus described in U.S. Pat. No. 4,519,193 to Yoshida et al., and others.

These conventional harvesting tools and manipulators suffer from a number of disadvantages. First, the time taken to reach the crop items from an initial position is relatively long, thereby lowering the crop harvesting rate. Second, some of the tools and manipulators have difficulty in harvesting crop items which are not hanging from substantially vertical stems, thereby leaving some of the crop items still on the growth sources either to be picked manually at a later stage or disregarded thereby lowering the actual yield of crop items from the potential yield of crop items from given growth sources. And lastly, many of the conventional harvesting tools and manipulators cause considerable damage to the growth sources by pulling on the growth sources during the harvesting of the crop items.

Therefore, there is a need for novel automatically guided tractors, trolleys, and the like, for pursuing a pre-determined path through growth sources of crop items and for novel harvesting tools and manipulators for harvesting crop items hanging by stems from their growth sources which overcome the disadvantages of conventional apparatus.

SUMMARY OF THE INVENTION

The object of the present invention is to provide automatically guided tractors, trolleys, and the like, for pursuing a pre-determined path through growth sources of crop items.

A further object of the present invention is to provide harvesting tools and manipulators for harvesting crop items hanging by stems from their growth sources.

Hence, there is provided according to the teachings of the present invention, a system for executing a farming activity on a working area including one or more growing areas of crop items, the system comprising: (a) a track extending substantially parallel to and in a spaced relationship from one or more of the growing areas of crops; and (b) a trolley driven along the track, the trolley including farm equipment for executing a farming activity on the growing areas of crops.

According to a further feature of the present invention, the track is buried underground.

According to a still further feature of the present invention, the track is laid on the ground.

According to a yet still further feature of the present invention, the track is an overhead track.

According to a yet still further feature of the present invention, the track is a permanent fixture in the working area.

According to a yet still further feature of the present invention, the track is a portable fixture which can be selectively deployed in one or more working areas.

According to a yet still further feature of the present invention, the farm equipment includes: (i) an object location apparatus including a camera for determining the location of a crop item relative to a pre-determined point of reference, the camera having an optical center; and (ii) a harvesting tool for harvesting a crop item located by the object location apparatus, the tool having an imaginary anchor point, the optical center and the anchor point being substantially coincident in space such that the tool approaches the object along a line of action which is substantially coincident with a line of sight between the crop item and the optical center.

According to a yet still further feature of the present invention, the harvesting tool harvests a crop item hanging by a stem from its growth source, the harvesting tool including: (i) a base; and (ii) a cutterhead mounted on the base, the cutterhead including an array of at least three fingers for accommodating the stem between a pair of adjacent fingers, the array of fingers having a substantially arcuate configuration and dimensioned so as to envelop at least the top portion of the crop item, and a stem cutter for cutting the stem when accommodated by the pair of adjacent fingers.

According to a yet still further feature of the present invention, the crop harvesting tool harvests a crop item from its growth source, the harvesting tool including: (i) a manipulator for selectively harvesting the crop item, the manipulator detaching the crop item from its growth source during a displacement from an extended position in which the manipulator grips the crop item at its growth source to an retracted position; and (ii) a stabilizer for stabilizing the growth source while the crop item is being harvested therefrom, the stabilizer assuming a growth source engaging position before the manipulator is displaced from its extended position to its retracted position.

According to a yet still further feature of the present invention, the farm equipment further includes: (iii) cleaning apparatus for cleaning crop items as they descend from a first height to a second height, and (iv) sorting apparatus for sorting crop items according to size, the sorting apparatus being deployed either at the first height or the second height.

There is also provided according to the teachings of the present invention, a harvesting tool for harvesting a crop item hanging by a stem from its growth source, the harvesting tool comprising: (a) a base; and (b) a cutterhead mounted on the base, the cutterhead including: i) an array of at least three fingers for accommodating the stem between a pair of adjacent fingers, the array of fingers having a substantially arcuate configuration and dimensioned so as to envelop at least the top portion of the crop item, and (ii) a stem cutter for cutting the stem when accommodated by the pair of adjacent fingers.

According to a further feature of the present invention, the cutterhead is rotatably mounted on the base for enabling a selectively variable forward pitch thereof relative to the base so as to capture the stem when inclined away from the cutterhead.

According to a still further feature of the present invention, the stem cutter includes a rotatable cutter movable along a path parallel to and in close proximity to the array of fingers.

According to a yet still further feature of the present invention, the stem cutter includes a second array of at least two fingers, the array of fingers and the stem cutter having an overlapping portion, the array of fingers and the stem cutter being displaceable relative to one another between: i) a stem accommodating position in which the stem extends between a pair of adjacent fingers of the array of fingers and a pair of adjacent fingers of the stem cutter, and ii) a stem cutting position in which the stem is cut by a shearing action between the array of fingers and the stem cutter.

According to a yet still further feature of the present invention, the harvesting tool further comprising: (c) a first sensor for providing a signal at a first pre-determined distance from a crop item; (d) a second sensor for providing a signal at a second pre-determined distance from a crop item, the second pre-determined distance being less than the first pre-determined distance; and (e) a third sensor for providing a signal when the stem impacts the cutterhead.

There is still further provided according to the present invention a harvesting tool for harvesting a crop item from its growth source, the harvesting tool comprising: (a) a manipulator for selectively harvesting the crop item, the manipulator detaching the crop item from its growth source during a displacement from an extended position in which the manipulator grips the crop item at its growth source to an retracted position; and (b) a stabilizer for stabilizing the growth source while the crop item is being harvested therefrom, the stabilizer assuming a growth source engaging position before the manipulator is displaced from its extended position to its retracted position.

According to a yet still further feature of the present invention, the stabilizer has an aperture through which at least a portion of the manipulator extends so as to grip the crop item.

According to a yet still further feature of the present invention, the harvesting tool further comprising: (c) a first sensor for providing a signal at a first pre-determined distance from a crop item; and (d) a second sensor for providing a signal at a second pre-determined distance from a crop item, the second pre-determined distance being less than the first pre-determined distance.

According to a yet still further feature of the present invention, the manipulator includes: (i) a rotatable disc; and (ii) at least three fingers, each of the at least three fingers having one end connected to the disc and a free end, the disc having a first position in which the free ends are urged toward one another in a crop gripping position and a second position in which the free ends are urged away from one another in a crop releasing position.

BRIEF DESCRIPTION OF THE DRAWINGS

The invention is herein described, by way of example only, with reference to the accompanying drawings, in which similar reference numbers have been employed throughout to designate corresponding parts, wherein:

FIGS. 5a–5f are schematic views showing the operation of the harvesting tool of FIG. 4;

DESCRIPTION OF THE PREFERRED EMBODIMENTS

The present invention is of automatically guided tractors, trolleys, and the like, for pursuing a path through a work area including one or more growing areas of crop items and harvesting tools and manipulators for harvesting crop items hanging by stems from their growth sources.

The principles of the apparatus of the present invention may be better understood with reference to the drawings and the accompanying description.

Figure 1:
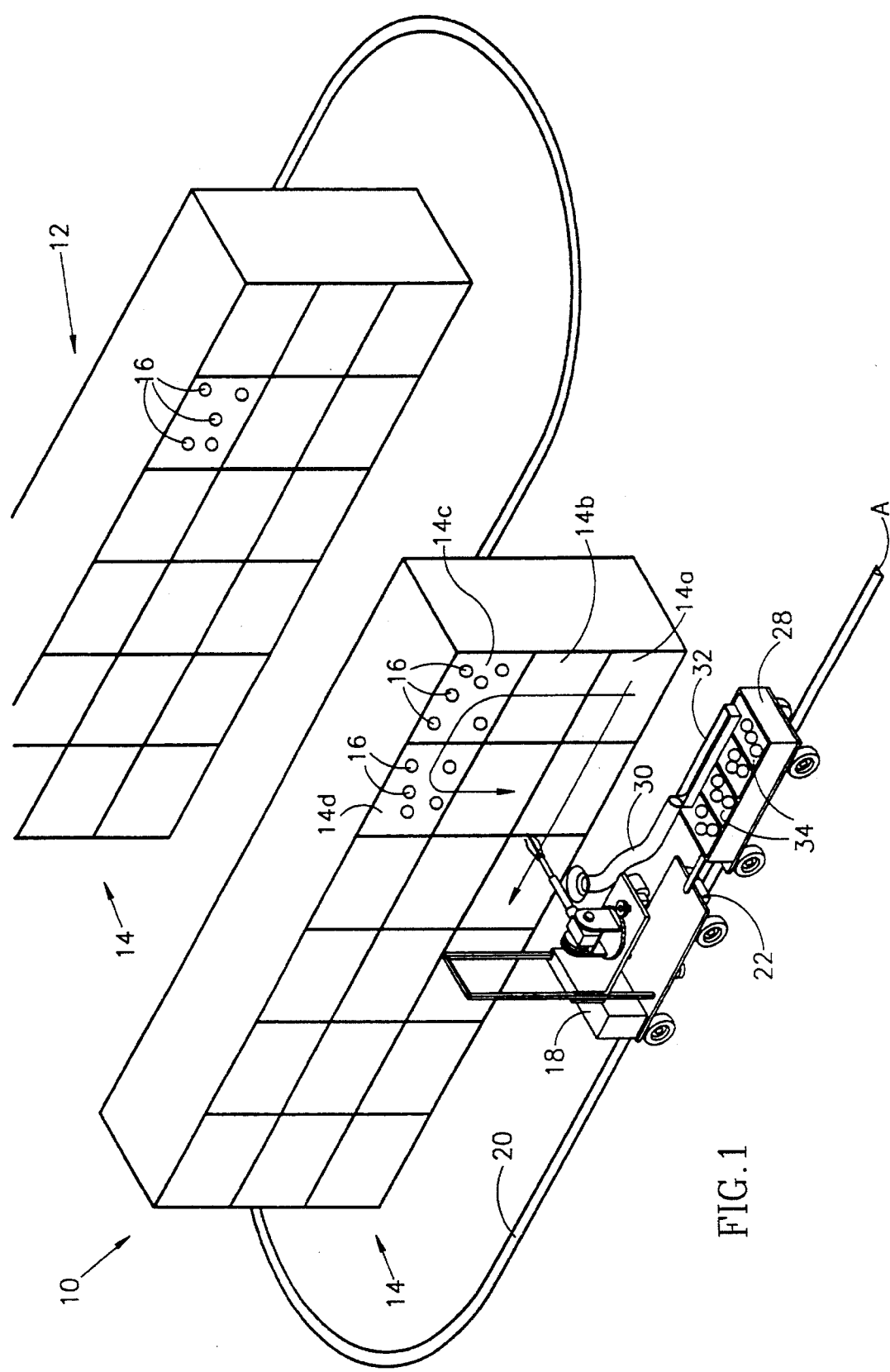
FIG. 1 is a schematic illustration of a system constructed and operative according to the teachings of the present invention for performing a farming activity on a working area including one or more growing areas of crop items.
Figure 2:
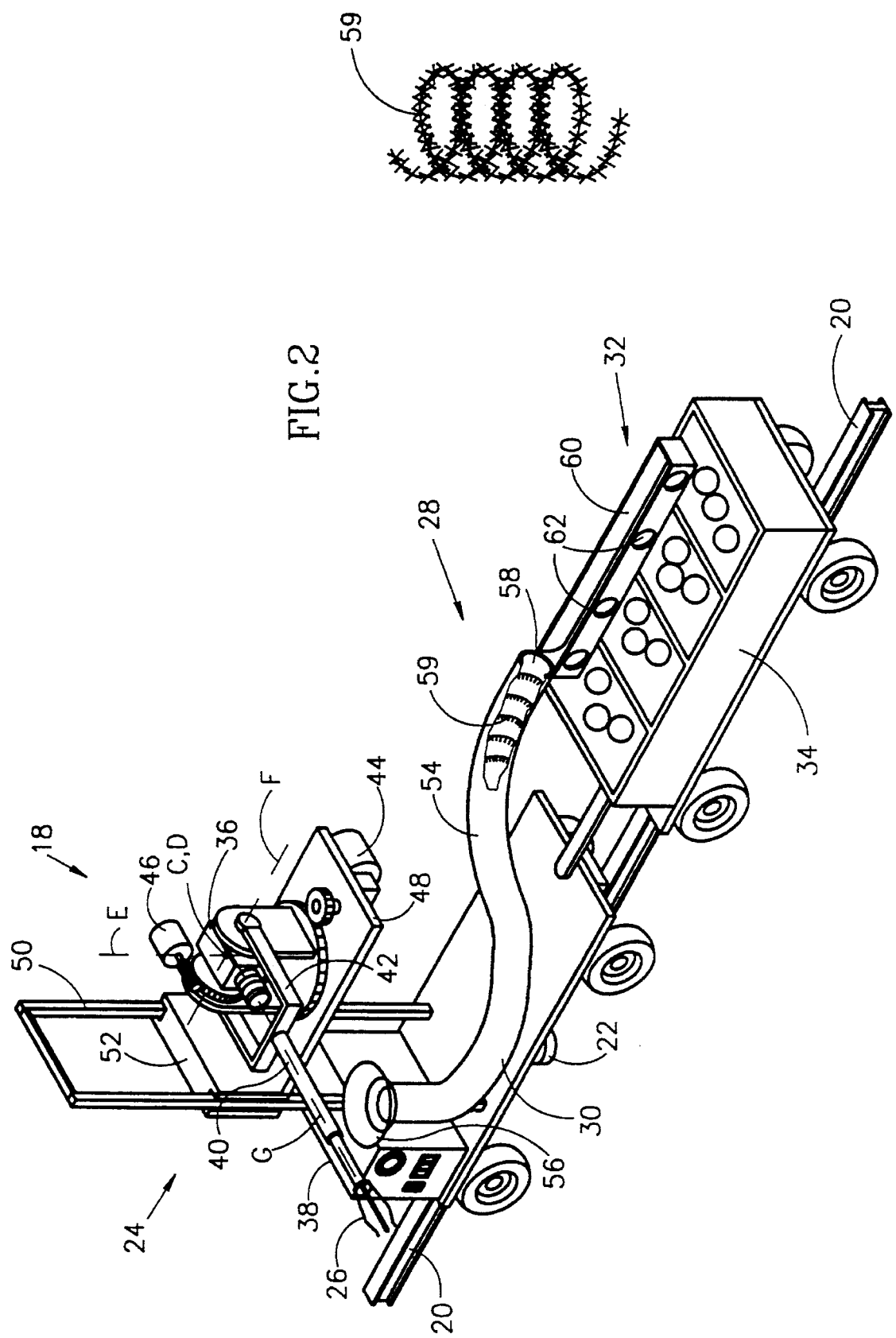
FIG. 2 is a perspective view of a trolley of the system of FIG. 1.
Figure 3:
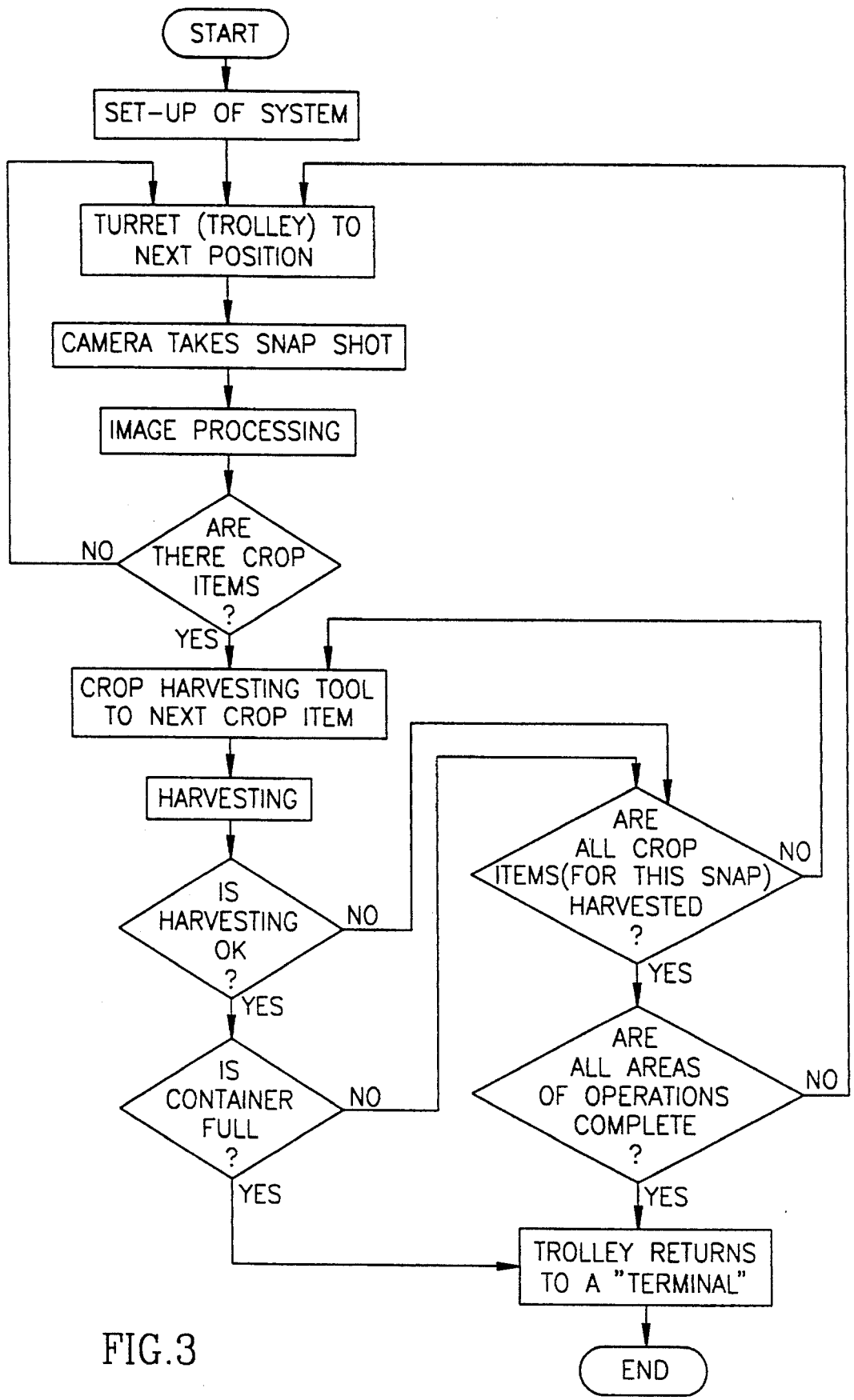
FIG. 3 is a flow diagram of the operation of the system of FIG. 1.

Referring now to the drawings, FIGS. 1–3 depict a system, generally designated 10, constructed and operative according to the teachings of the present invention, for executing a farming activity on a working area 12 including one or more growing areas 14 of crop items 16. Hence, it can be readily appreciated that system 10 can be adapted to accomplish a wide range of different tasks required during the growth of crop items from furrowing of plots of land, seeding, administering of fertilizers etc., harvesting of crop items and the like. System 10 can be deployed either indoors in greenhouses, hot houses, and the like, or outdoors in fields, orchards, and the like. For the purpose of exposition only, and without in any way limiting the scope of the present invention, system 10 is described for the purpose of harvesting crop items, for example, fruits, vegetables, and the like hanging by stems from growing areas of fruit growing trees, vegetable growing bushes and plants.

Generally speaking, system 10 includes one or more trolleys 18 driven along track 20 deployed substantially parallel to and in a spaced relationship from one or more growing areas 14 within working area 12. Therefore, a trolley 18 includes track location apparatus 22 for guiding trolley 18 along track 20 and a drive mechanism (not shown) for driving trolley 18 along track 20. Track location apparatus 22 can include a mechanical engagement device for mechanically engaging track 20. Alternatively, track location apparatus 22 can include any one of a wide range of sensors for picking up a signal from track 20.

Track 20 is preferably a continuous track extending from a start position denoted A of working area 12 to an end position denoted B (not shown) of working area 12 so as to enable access by trolley 18 to all of growing areas 14. Track 20 can be typically implemented as either a track buried underground, a track deployed on the ground, or as an overhead track. Furthermore, track 20 can be a permanent fixture deployed within working area 12 or, alternatively, track 20 can be a portable fixture such that it can be deployed within one of a number of working areas depending on the needs of the different working areas.

It should be noted that system 10 provides a number of important advantages over conventional automatically guided tractors, trolleys, and the like used for performing farming activities on a working area. First, trolley 18 does not need programming with a pre-determined path. Second, trolley 18 cannot "run away" from track 20 and therefore system 10 does not require safety features such as a cable or laser beams delineating a pre-determined work area. Third, track 20 can be conveniently and repeatedly deployed in different working areas, thereby reducing equipment outlay costs, track laying costs, and the like. And lastly, the tracking of track 20 by track location apparatus 22 cannot be interfered by growing areas 14.

As mentioned hereinabove, system 10 is being described for the purpose of harvesting crop items, for example, fruits, vegetables, and the like hanging by stems from growing areas of fruit growing trees, vegetable growing bushes and plants, and the like. Hence, trolley 18 includes object location apparatus, generally designated 24, for determining the location of crop items 16 relative to a pre-determined reference point and a harvesting tool 26 for harvesting crop items 16 as located by object location apparatus 24. Harvesting tool 26 can be any one of a number of conventional crop harvesting tools, however, harvesting tool 26 is preferably one of the novel harvesting tools of the present invention described hereinbelow with reference to FIGS. 4–10. Preferably trolley 18 tows a second trolley 28 therebehind including cleaning apparatus 30 for cleaning crop items 16, sorting apparatus 32 for sorting crop items 16 according to a pre-determined parameter and storage containers 34 for storing crop items 16 after they have been cleaned and sorted.

Object location apparatus 24 preferably includes a TV camera 36 and a processor 38 for running image processing software for selecting which crop items 16 are to be harvested according to pre-determined characteristics including, but not limited, size, ripeness, and the like. The pre-determined reference point of object location apparatus 24 is typically the optical center of camera 36 denoted C. It should be noted that processor 38 is required to run several routines before finally selecting which crop items 16 are harvestable by harvesting tool 26. First, processor 38 is required to distinguish crop items 16 within growing areas 14. And second, processor 38 is required to determine which crop items 16 are reachable by harvesting tool 26. For example, a crop item 16 often cannot be harvested if it is mostly hidden by a branch of a fruit tree.

Harvesting tool 26 is mounted on the free end of an extendible staff 40 terminating in a fork 42. Staff 40 has an imaginary anchor point denoted D defined as the juncture between a vertical axis of rotation denoted E of staff 40 and a horizontal axis of rotation denoted F of staff 40. Harvesting tool 26 is rotated about vertical axis of rotation E by motor 44 and is rotated about horizontal axis of rotation F by motor 46. Actuation of motors 44 and 46 is controlled by processor 38. The angle of rotation about axes E and F are such that harvesting tool 26 can be directed in any direction within the field of view of camera 36.

It is a particular feature of the present invention that imaginary anchor point D of harvesting tool 26 and optical center C of camera 36 substantially coincide in space such that the line of action denoted G along which harvesting tool 26 reaches outward toward a crop item 16 relative to its imaginary anchor point D is coincident with the line of sight from the crop item 16 to optical center C of camera 36. This arrangement is designed so as to ensure that any crop item identified by processor 38 for harvesting is harvestable by harvesting tool 26.

Harvesting tool 26 and camera 36 are preferably mounted on a platform 48 which is slidably mounted on a vertical stand 50 such that the height of platform 48 can be varied on actuation of a motor 52 relative to ground level. This arrangement ensures that camera 36 can be deployed in an opposing manner opposite a portion of a working area 14 which has to be harvested.

It should be noted that the field of view of camera 36 is obscured by harvesting tool 26 when harvesting tool 26 is deployed along its line of action G. Hence, system 10 has a pre-determined "home position" in which camera 36 has an unobscured field of view. The home position of system 10 is preferably determined such that harvesting tool 26 is deployed over trolley 28, thereby enabling a harvested crop item 16 to be further handled by cleaning apparatus 30 and sorting apparatus 32.

Cleaning apparatus 30 is preferably implemented a chute 54 having an inlet aperture 56 at a first height and an outlet aperture 58 at a second height below the first height and an interior helical brush-like device 59 such that crop items 16 are cleaned as they descend through chute 54. Sorting apparatus 32 is preferably implemented as a U-shaped tray 60 deployed so as to receive crop items 16 from outlet aperture 58 and having a series of apertures 62 for sorting crop items 16 according to size. Hence, in the preferred embodiment of system 10, crop items 16 are first cleaned and then sorted. Alternatively, crop items 16 can be first sorted and then cleaned.

The operation of system 10 is now described with reference to FIGS. 1–3. The set up of system 10 includes laying track 20 within working area 12 substantially parallel to and in a spaced relationship from growing areas 14, deploying one or more trolleys 18 and 28 on track 20 and programming processor 38 to select which crop items 16 are to be harvested by harvesting tool 26.

After the set-up of system 10, trolley 18 begins it travel along track 20 from, say, start position A. Processor 38 issues commands to motor 52 to set platform 48 at the lowest position on vertical stand 50, deploys harvesting tool 26 in its home position such that the field of view of camera 36 is not obscured and actuates camera 36 to take a snap shot of the bottom portion designated 14a of growing area 14.

Processor 38 processes the snap shot to determine which of crop items 16 in growing area 14a are to be harvested and issues commands for harvesting tool 26 to reach crop items 16 selected for harvesting. The commands include the rotation about vertical axis E by actuation of motor 44, rotation about horizontal axis F by actuation of motor 46 and extension of harvesting tool 26 along its line of action G. After each crop item 16 is harvested, harvesting tool 26 deposits it in inlet aperture 56 of chute 54. Crop item 16 is cleaned as it descends through chute 54 and thereafter is sorted by sorting apparatus 32 by falling through one of apertures 62 into one of containers 34.

After harvesting tool 26 has harvested all crop items 16 selected for harvesting by processor 38 in growing area portion 14a, processor 38 issues commands for raising platform 48 to the second level upwards along stand 50 in preparation for harvesting crop items 16 from a growing area portion designated 14b. The operations for harvesting crop items 16 from growing area portion 14b are similar to the operations described hereinabove for harvesting crop items 16 from growing area portion 14a and are therefore not repeated. The same operations are repeated for the last portion of growing areas designated 14c accessible from the same location of trolley 18 on track 20.

After all the growing area portions accessible from the same location of trolley 18 on track 20 have been worked by harvesting tool 26, in this case growing area portions 14a, 14b, and 14c, processor 38 issues commands to drive trolley 18 to the next location along track 20 for working growing area portion 14d.

It can therefore be readily appreciated that system 10 offers a convenient, efficient and systematic manner for harvesting all growing areas 14 in working area 12 in a column-by-column mode. Alternatively, processor 38 can be programmed for harvesting all growing areas 14 in working area 12 in a row-by-row mode.

It should be noted that processor 38 interrupts the harvesting of crop items 16 when containers 34 are full. This can be achieved by processor 38 counting how many crop items 16 are harvested, weighing containers 34, taking a snap shot of containers 34, and the like. In this instance, processor 38 issues commands to trolley 18 to travel to a pre-determined point along track 20 for unloading crop items 16 in containers 34 to a centralized storage facility.

Figure 4:
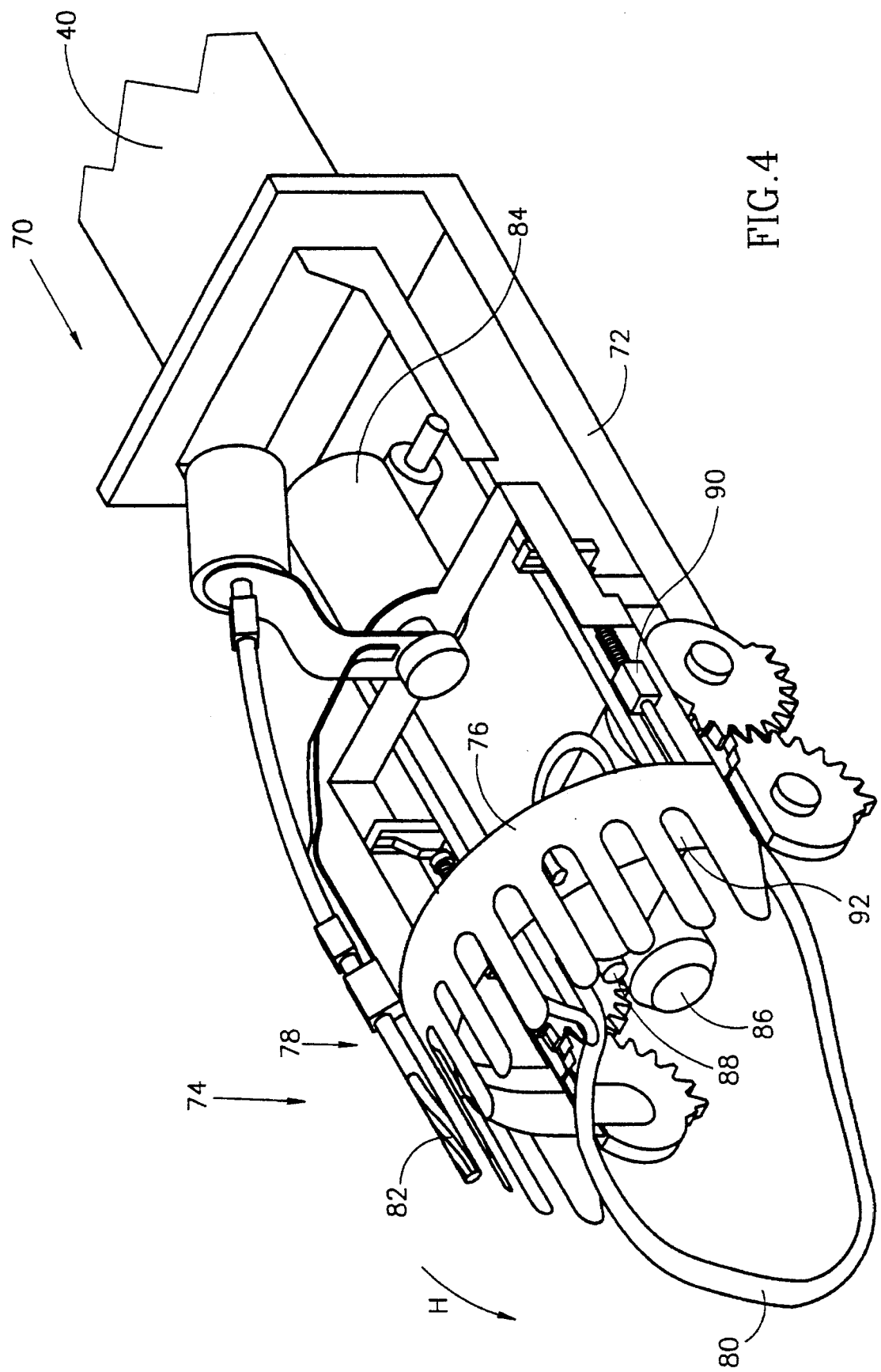
FIG. 4 is a perspective view of a first embodiment of a harvesting tool of the present invention.

With reference now to FIG. 4, the perspective view shows a harvesting tool, generally designated 70, constructed and operative according to the teachings of the present invention, for harvesting a crop item hanging by a stem from its growth source. Generally speaking, harvesting tool 70 includes a base 72 for attaching to the free end of staff 40 and a cutterhead 74 mounted on base 72. Cutterhead 74 is preferably rotatably mounted on base 72 for enabling a selectively variable forward pitch thereof relative to base 72 denoted H so as to trap a stem inclined away from cutterhead 74.

Cutterhead 74 includes an array of elongated fingers 76 for trapping a stem between an adjacent pair of fingers, a stem cutter 78 for cutting a stem when trapped by a pair of fingers of array of fingers 76 and a support 80 for supporting a crop item after it has been cut from its growth source. As can be readily seen, array of fingers 76 preferably has a substantially semi-circular configuration and is dimensioned so as to accommodate at least the top portion of a crop item. The arcuate configuration of cutterhead 74 ensures that array of fingers 76 can trap stems of crop items subtending an angle of approximately ±80° with respect to the vertical in the horizontal plane of cutterhead 74. Stem cutter 78 is preferably implemented as a rotatable cutter 82 movable along a curvilinear path parallel and in close proximity to array of fingers 76 by a motor 84. Typically, rotatable cutter 82 is displaced from one end of array of fingers 76 to the other end of array of fingers 76 during a pass to cut a stem.

Harvesting tool 70 preferably includes three sensors: First, a rangefinder sensor 86 for providing a signal at distance of about 15 cm from a crop item, thereby indicating to processor 38 that harvesting tool 70 is closing in on a crop item and that the approach speed of harvesting tool 70 should be reduced from an initial fast approach speed when harvesting tool 70 is distant from a crop item to a final slow approach speed. Second, a rangefinder sensor 88 for providing a signal at a distance of about 2 cm from a crop item, thereby indicating to processor 38 that a crop item is accommodated within the confines of cutterhead 74 and that the forward motion of harvesting tool 70 should be stopped. The distance at which sensor 88 is actuated depends on the size of crop items 16 and the length of array of fingers 76. And lastly, a spring-based touch sensor 90 for providing a signal when the stem of the crop item trapped by cutterhead 74 impacts an impact plate 92, thereby indicating to processor 38 that rotatable cutter 82 and motor 84 can be actuated so as to cut the stem.

It should be noted that in the case that the stem of a crop item accommodated within cutterhead 74 is substantially vertically deployed or inclined toward base 72, then sensor 88 and sensor 90 provide substantially concurrent signals. However, in the case that the stem of a crop item accommodated within cutterhead 74 is inclined away from base 72, then sensor 88 provides a signal but sensor 90 does not provide a signal because impact plate 92 is not impacted by the stem. In this instance, cutterhead 74 is rotated forward relative to base 72 until such time that the stem impacts impact plate 92, thereby actuating sensor 90.

Figure 5D:
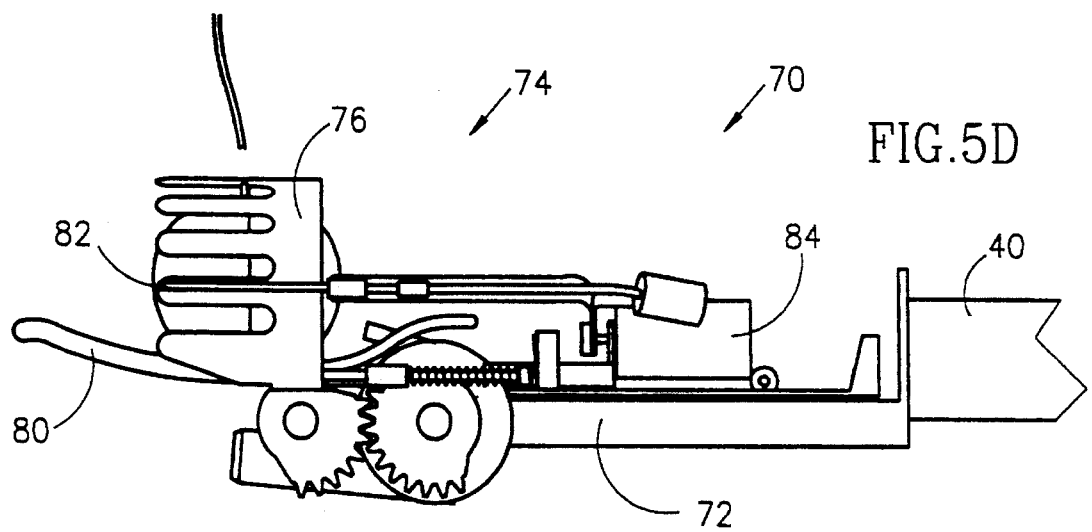

The operation of harvesting tool 70 is now described with reference to FIGS. 5a–5f. First, as shown in FIG. 5a, harvesting tool 70 approaches a crop item 16 selected for harvesting by processor 38 at a fast approach speed. Second, as shown in FIG. 5b, at the pre-determined distance of, say, 15 cm, sensor 86 sends a signal to processor 38 that harvesting tool 70 is closing in on a crop item. In response, processor 38 reduces the approach speed of harvesting tool 70 to a final slow approach speed. Third, as shown in FIG.

5c, after the stem of the crop item to be harvested has been trapped by a pair of fingers of array of fingers 76, sensor 88 sends a signal to processor 38 at the pre-determined distance of, say, 2 cm, that the forward motion of harvesting tool 70 should be interrupted.

Figure 5E:
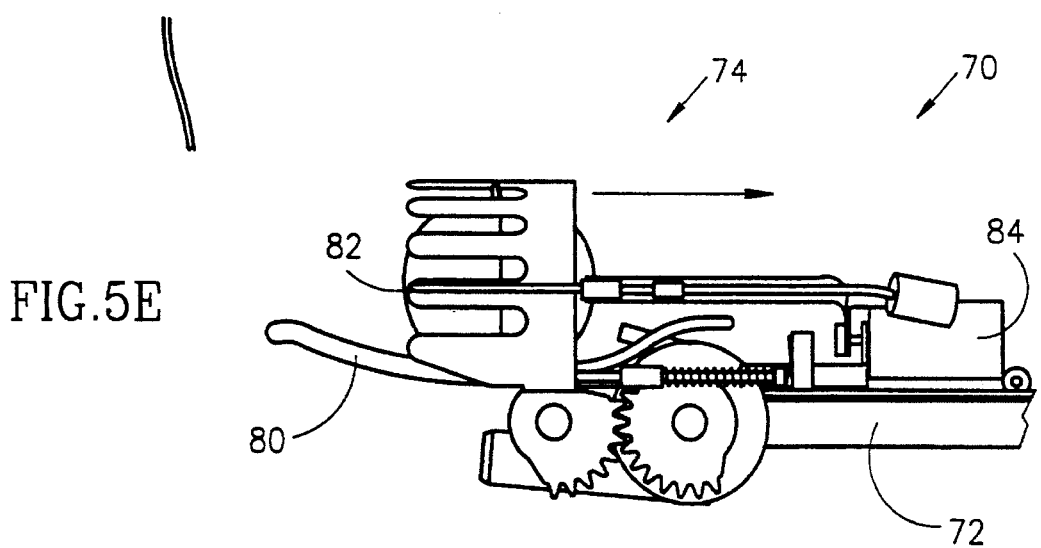
Figure 5F:
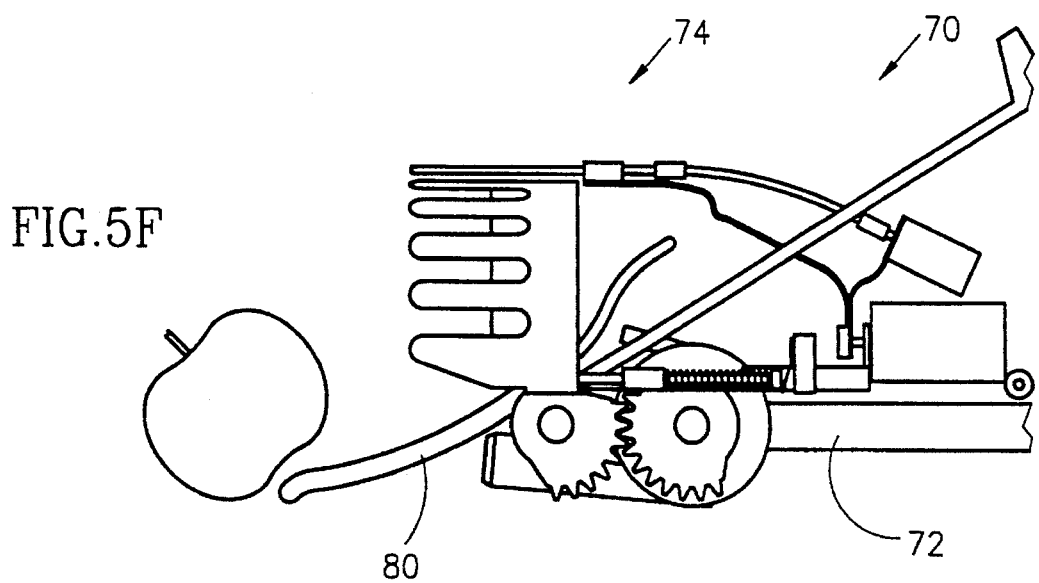

At substantially the same time, as shown in FIG. 5d, the stem impacts impact plate 92, thereby actuating sensor 90 which sends a signal to processor 38 for initiating the cutting of the stem. This is achieved by processor 38 actuating rotatable cutter 82 and motor 84 such that rotatable cutter 78 executes a curvilinear path over array of fingers 76 so as to cut the stem at some point along its path. Thereafter, as shown in FIG. 5e, harvesting tool 70 is retracted away from the growth source of the crop item temporarily supported by support 80. Finally, as shown in FIG. 5f, processor 38 tips support 80 so as to release the harvested crop item.

Figure 6A:
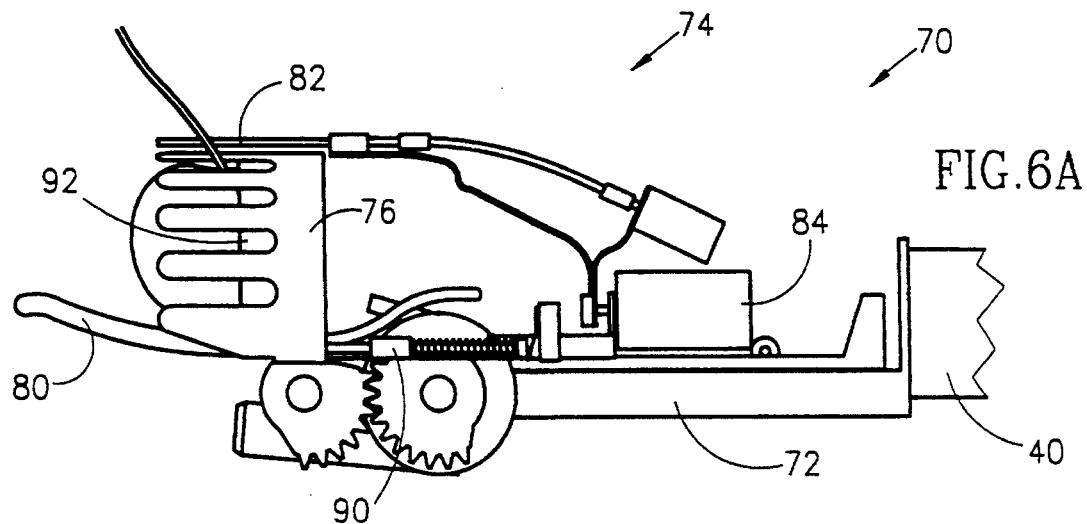
FIGS. 6a–6c are schematic views showing the forward tipping of the cutterhead of the harvesting tool of FIG. 4 to trap a stem inclined away from the base of the harvesting tool.
Figure 6B:
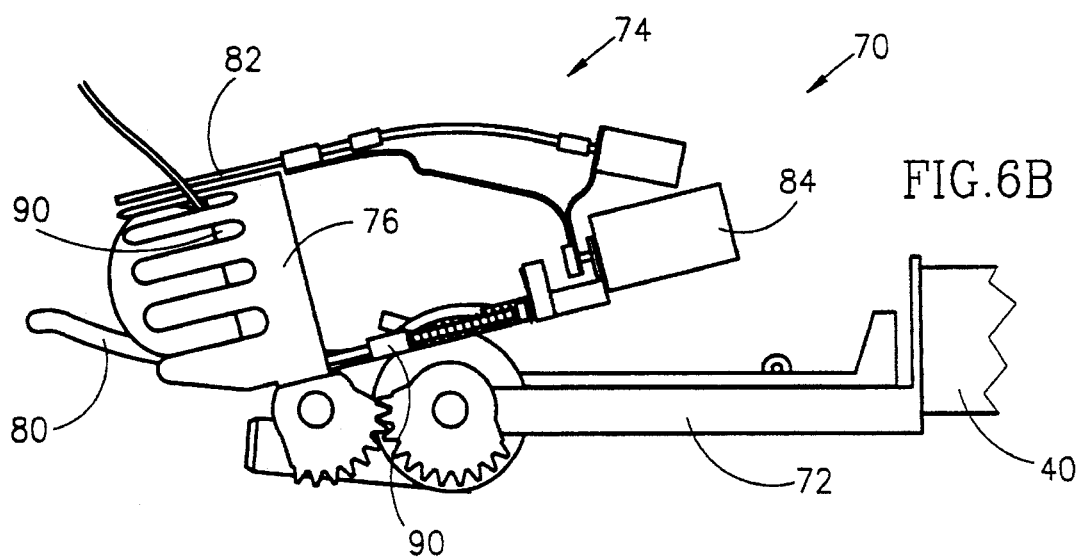
Figure 6C:
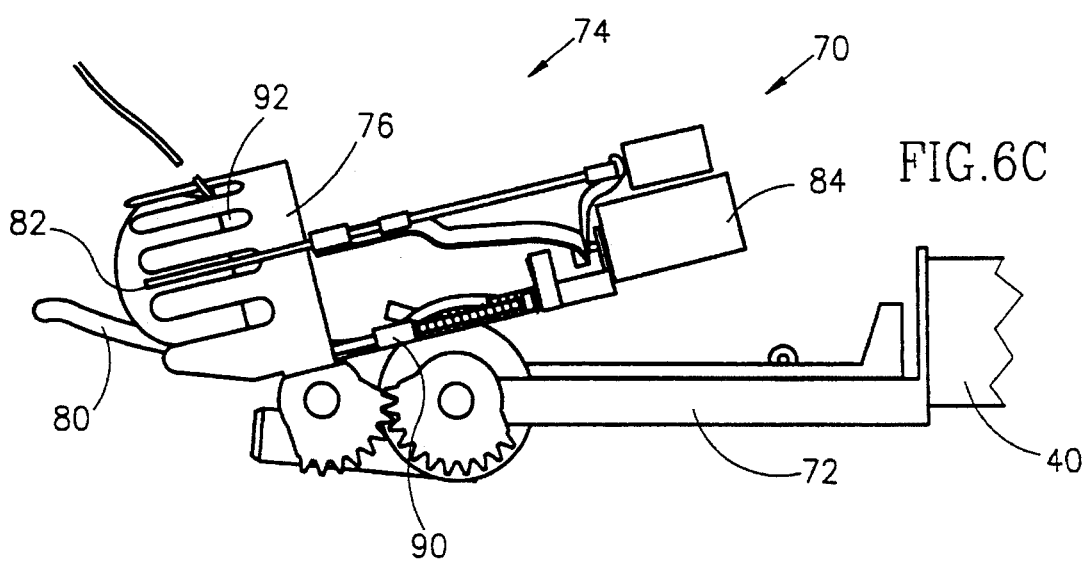

Turning now to briefly to FIGS. 6a–6c, the schematic views depict cutterhead 74 being tipped forward relative to base 72 so as to trap a stem inclined away from base 72 between a pair of fingers of array of fingers 76 and to impact impact plate 92. As before, impact on impact plate 92 enables sensor 90 of harvesting tool 70 to send a signal to processor 38 for actuation of rotatable cutter 82 and motor 84 for the curing of the stem.

Figure 7:
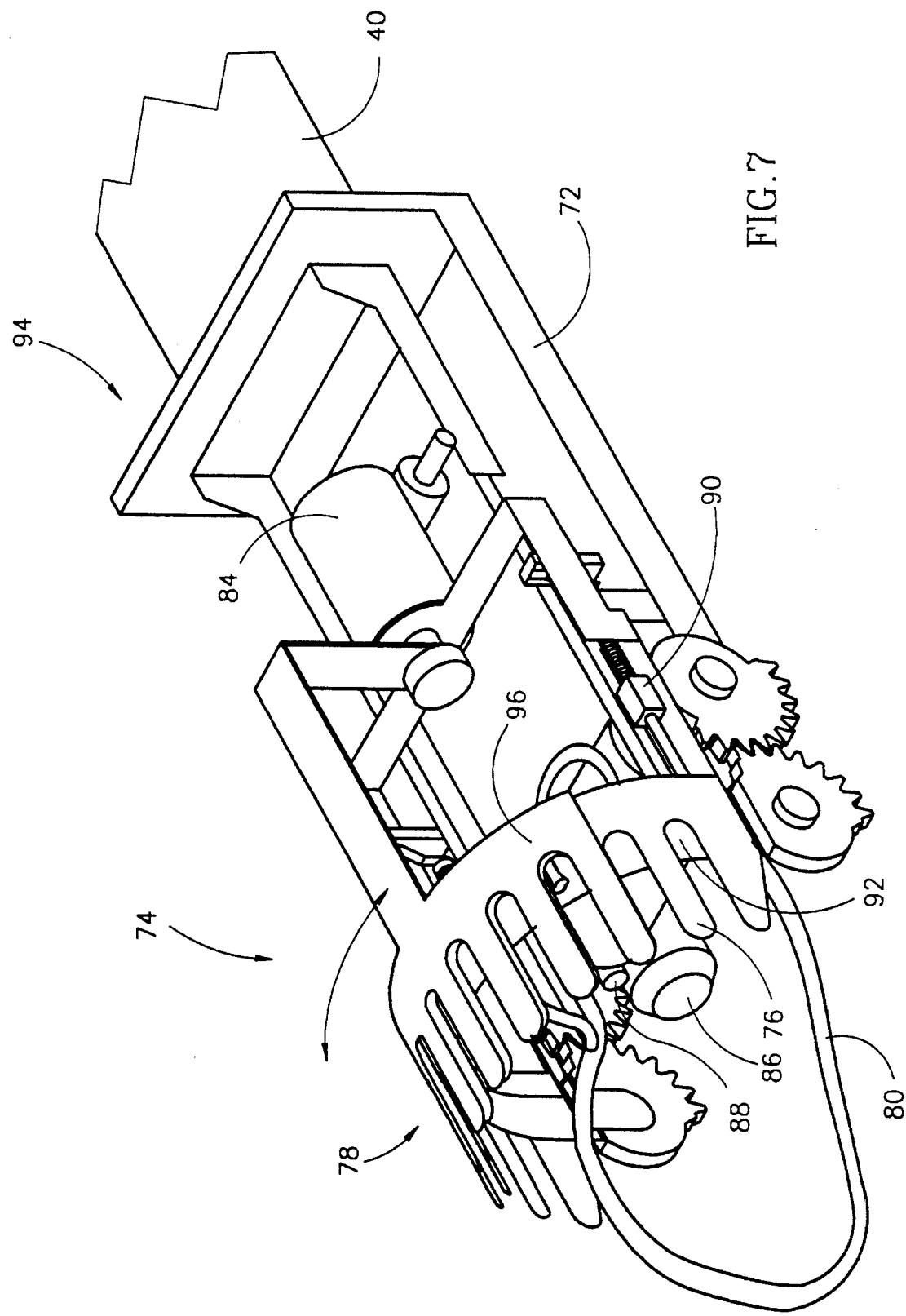
FIG. 7 is a perspective view of a second embodiment of a harvesting tool of the present invention.

With reference now to FIG. 7, the schematic view shows a second embodiment of a harvesting tool, generally designated 94, constructed and operative according to the teachings of the present invention, for harvesting a crop item hanging by a stem from a growth source. Harvesting tool 94 is similar to harvesting tool 70 except that stem cutter 78 is implemented as a second array of fingers 96 at least partially overlapping array of fingers 76. In a similar manner to rotatable cutter 82, array of fingers 96 is displaceable from one end of array of fingers 76 to the other end of array of fingers 76 during a pass to cut a stem of a crop item.

All in all, array of fingers 76 and array of fingers 96 assume one of two positions: First, a stem trapping position in which a stem extends between a pair of adjacent fingers of array of fingers 76 and a pair of adjacent fingers of array of fingers 96 and second, a stem cutting position in which the stem is cut by a shearing action between array of fingers 76 and array of fingers 96 as stem cutter 78 travels along its curvilinear pass.

Figure 8:
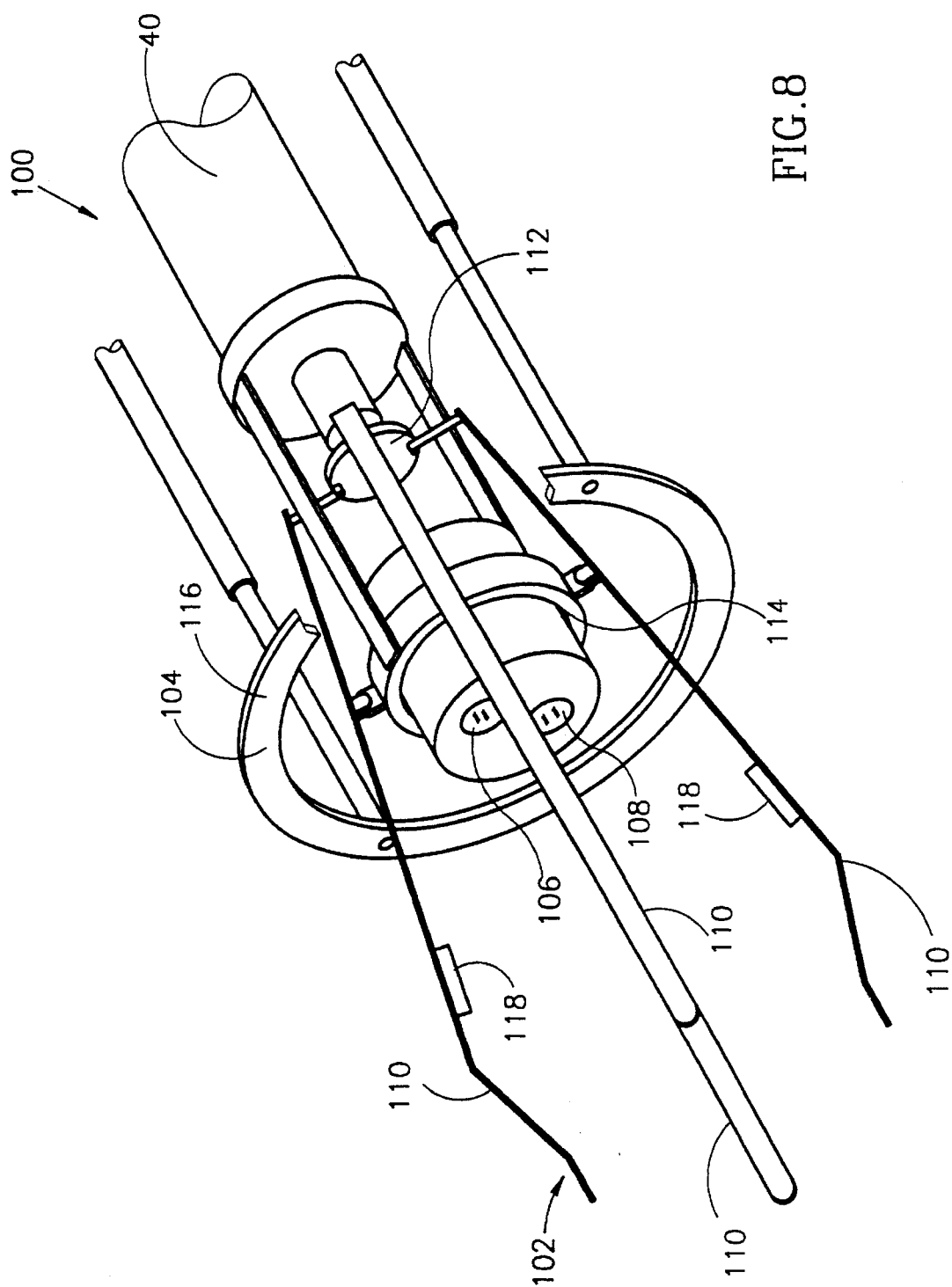
FIG. 8 is a perspective view of a third embodiment of a harvesting tool of the present invention.

With reference now to FIG. 8, the schematic figure depicts a third embodiment of a harvesting tool, generally designated 100, constructed and operative according to the teachings of the present invention, for harvesting a crop item. Generally speaking, harvesting tool 100 includes a manipulator 102 for selectively harvesting a crop item by detaching the crop item from its growth source during a displacement from an extended position in which manipulator 102 grips the crop item at its growth source to an retracted position and a stabilizer 104 for stabilizing the growth source while the crop item is being harvested therefrom.

In a similar fashion to harvesting tool 70, harvesting tool 100 also preferably includes two rangefinder sensors 106 and 108 corresponding to sensors 86 and 88, respectively. Hence, sensor 106 typically provides a signal at distance of about 15 cm from a crop item, thereby indicating to processor 38 that harvesting tool 100 is closing in on a crop item and that the approach speed of harvesting tool 100 should be reduced from an initial fast approach speed when harvesting tool 100 is distant from a crop item to a final slow approach speed. While sensor 108 provides a signal at a distance of about 2 cm from a crop item, thereby indicating to processor 38 that a crop item is within the reach of manipulator 102 and that the forward motion of harvesting tool 100 should be stopped.

Figure 9A:
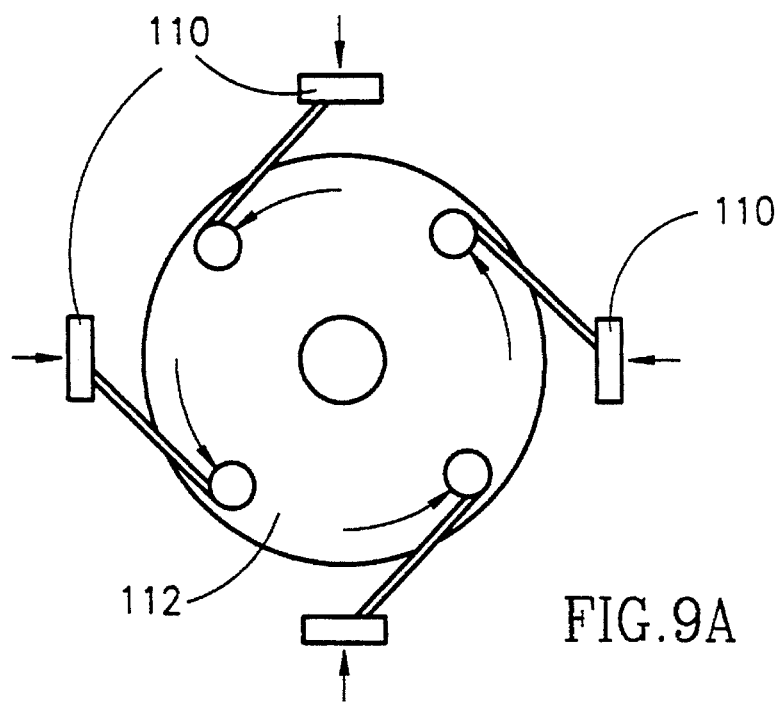
FIGS. 9a and 9b are schematic views depicting the closed arrangement and the open arrangement of the manipulator of FIG. 8.
Figure 9B:
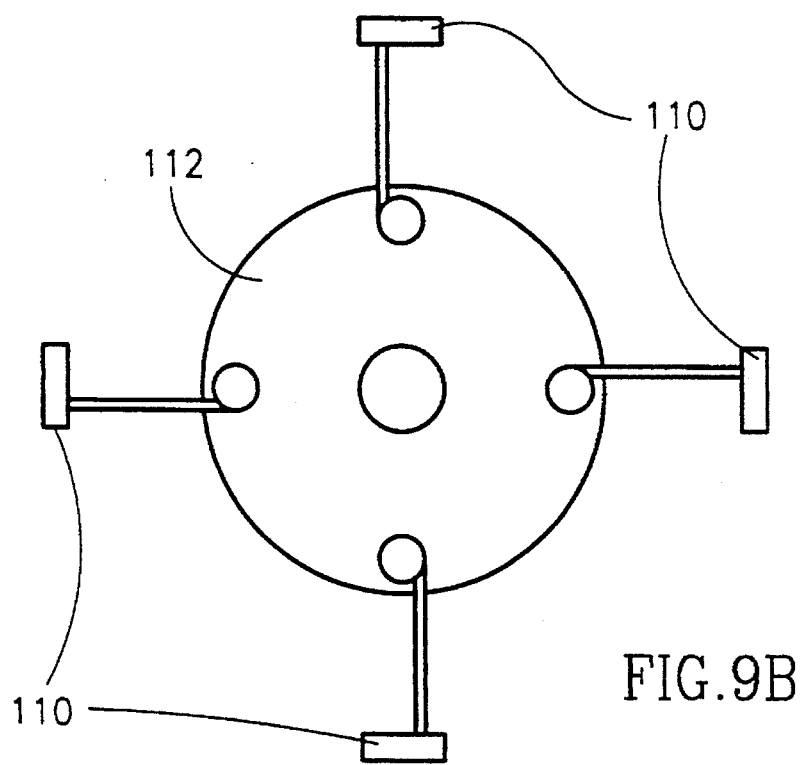

Manipulator 102 typically includes two pairs of opposing fingers 110, each finger having one end connected to a disc 112 and also being pivotally connected at some mid-point therealong to a sensor stand 114 carrying sensors 106 and 108. As shown in FIGS. 9a and 9b, disc 112 is rotatable between a first position (FIG. 9a) in which the free ends of fingers 110 are brought together in a closed arrangement and a second position, typically 90° from the first position, in which free ends of fingers 110 are spaced from one another in an open arrangement (FIG. 9b). The closed arrangement of manipulator 102 is employed for approaching a crop item while inflicting the minimum damage to the growth source of the crop item and gripping the crop item while the open arrangement is employed so as to enable manipulator 102 to grasp the crop item.

Stabilizer 104 is preferably a continuous circular element 116 having an aperture with a diameter greater than the distance between the free ends of a pair of fingers in the closed arrangement of manipulator 102 such that manipulator 102 can be extended in its closed arrangement through the aperture of stabilizer 104. It should, however, be noted that stabilizer 104 can also be provided as a number of discrete non-contiguous elements as long as the elements act so as to restrain a growth source from being pulled by a crop item as it is retracted away from the growth source.

Additionally, one or more touch sensors 118 can be attached to fingers 110 so as to ensure that disc 112 is only rotated through an angle sufficient that fingers 110 grip a crop item without inflicting any damage thereto by excessive squeezing. Alternatively, a pre-determined resistance by a crop item against the closing of fingers 110 can be employed as a measure for preventing damage to crops.

Figure 10A:
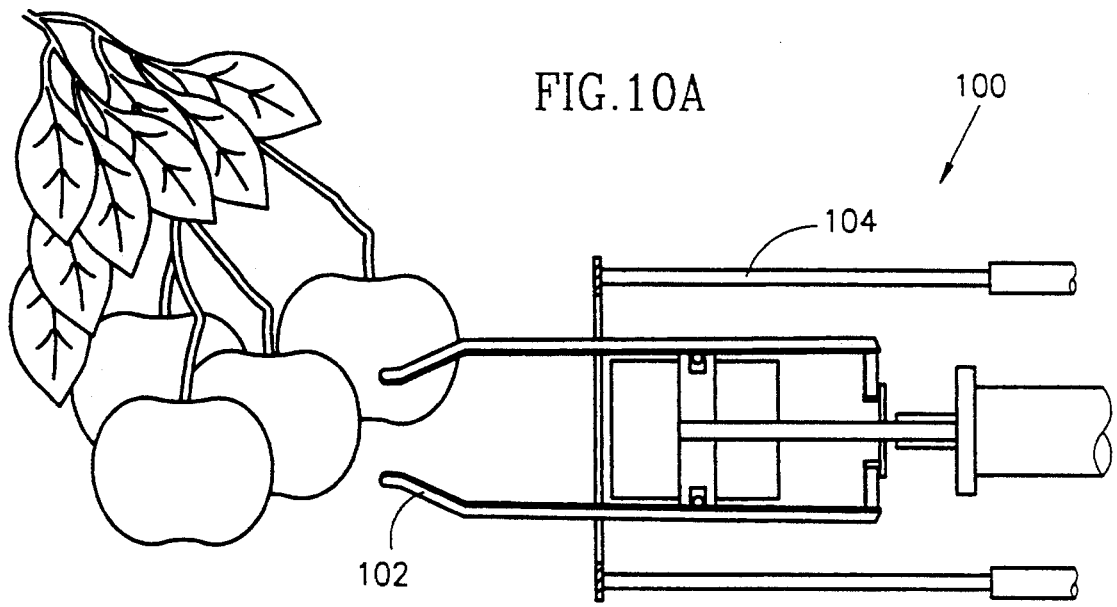
FIGS. 10a–10g are schematic views showing the operation of the harvesting tool of FIG. 8.
Figure 10B:
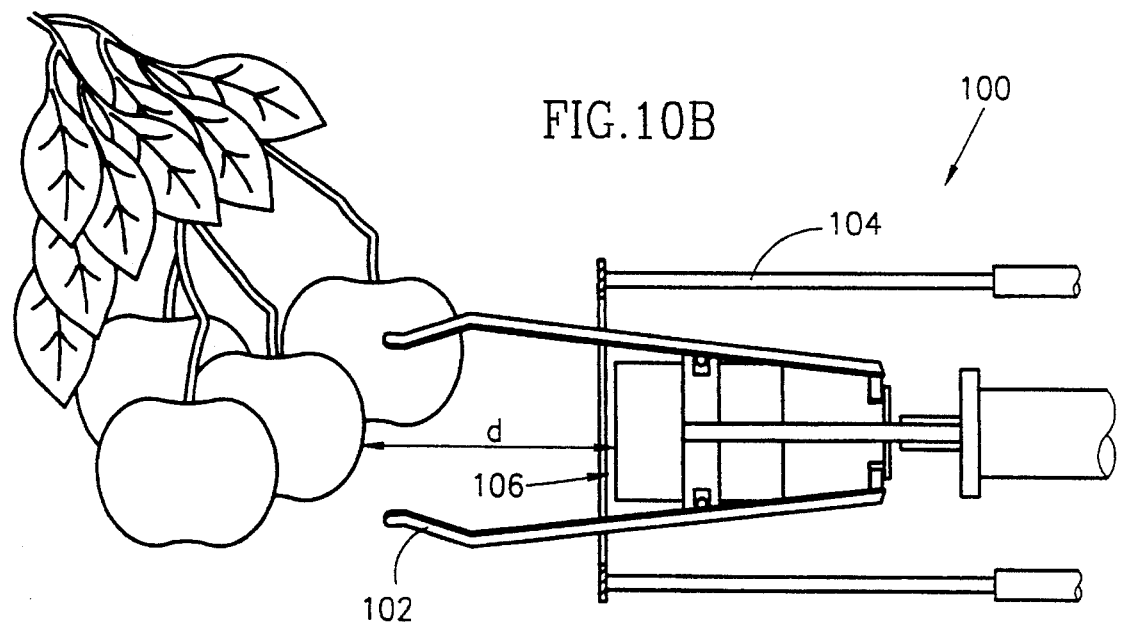
Figure 10C:
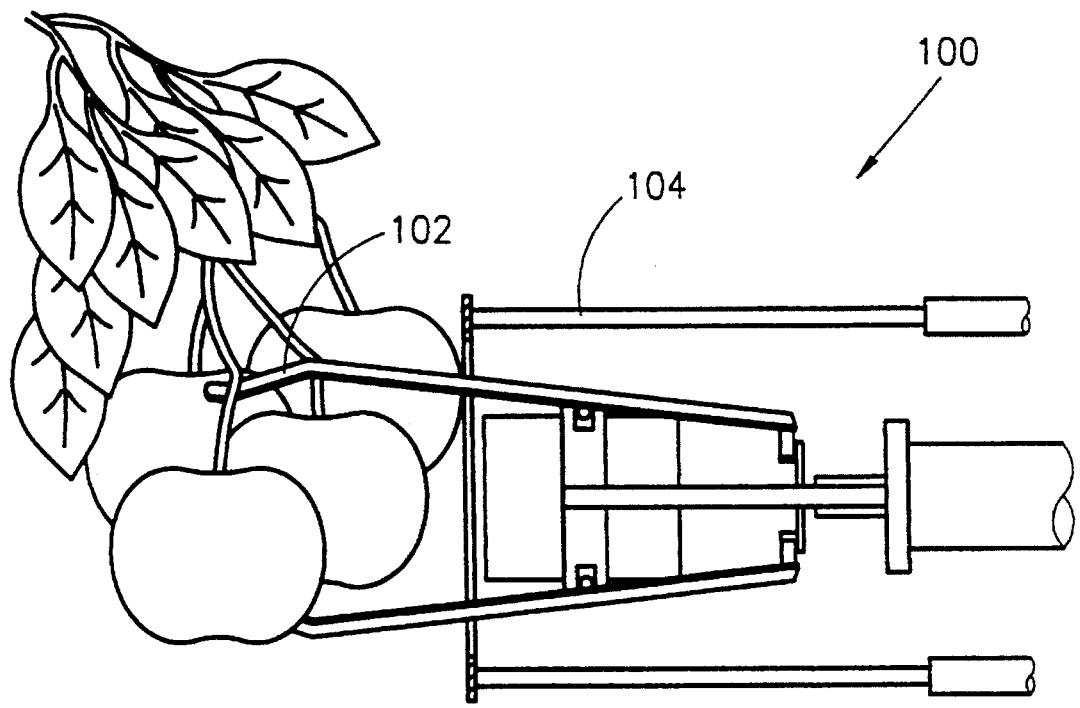
Figure 10D:
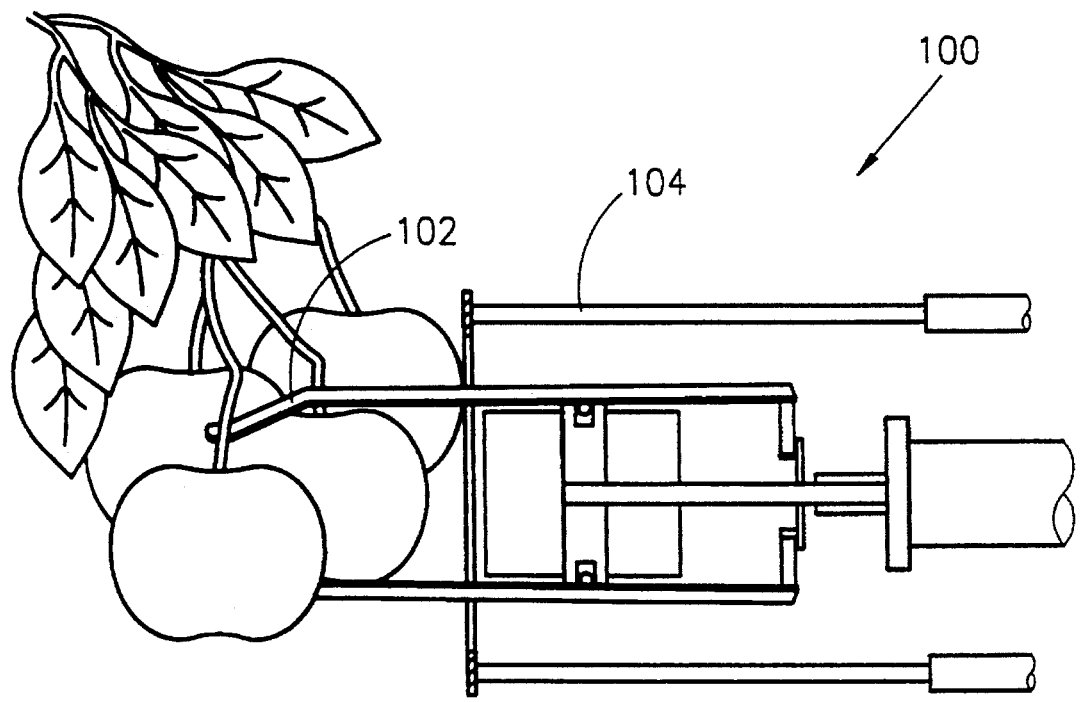

The operation of harvesting tool 100 is now described with reference to FIGS. 10a–10g. First, as shown in FIG. 10a, harvesting tool 100 with manipulator 102 in its closed arrangement approaches a crop item 16 selected for harvesting by processor 38 at a fast approach speed. Second, as shown in FIG. 10b, at the pre-determined distance of, say, 15 cm, sensor 106 sends a signal to processor 38 that harvesting tool 100 is closing in on a crop item. In response, processor 38 reduces the approach speed of harvesting tool 100 to a final slow approach speed and rotates disc 112 such that manipulator 102 assumes its open arrangement. Third, as shown in FIG. 10c, manipulator 102 accommodates crop item 16 therein while stabilizer 104 engages the growth source of crop item 16. Fourth, as shown in FIG. 10d, sensor 108 sends a signal to processor 38 at the pre-determined distance of, say, 2 cm, that the forward motion o harvesting tool 100 should be interrupted and that manipulator 102 should assume its close arrangement.

Figure 10E:
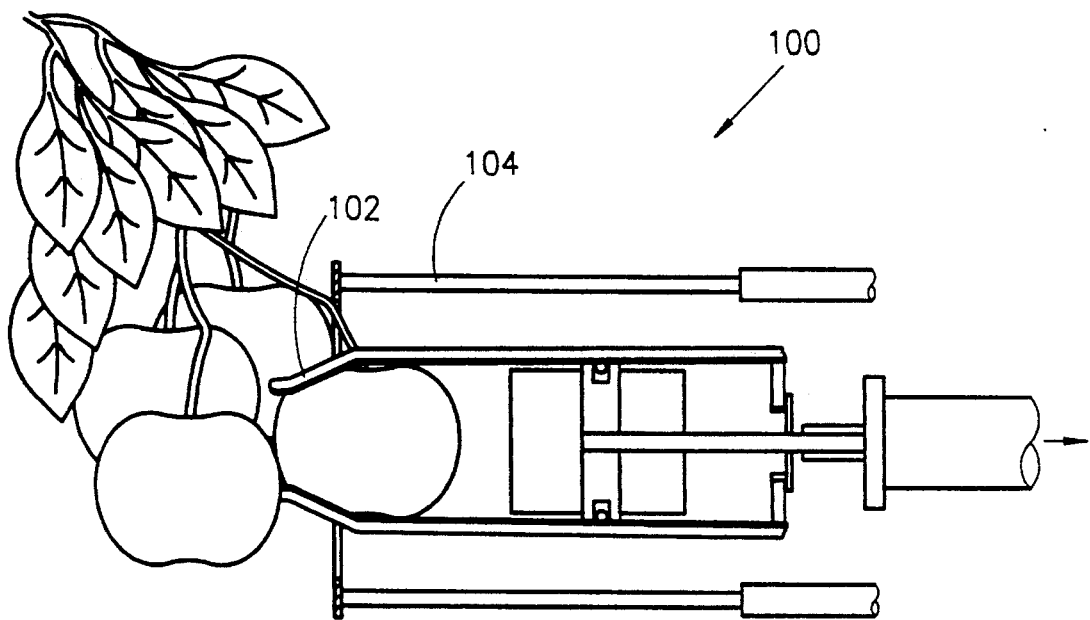
Figure 10F:
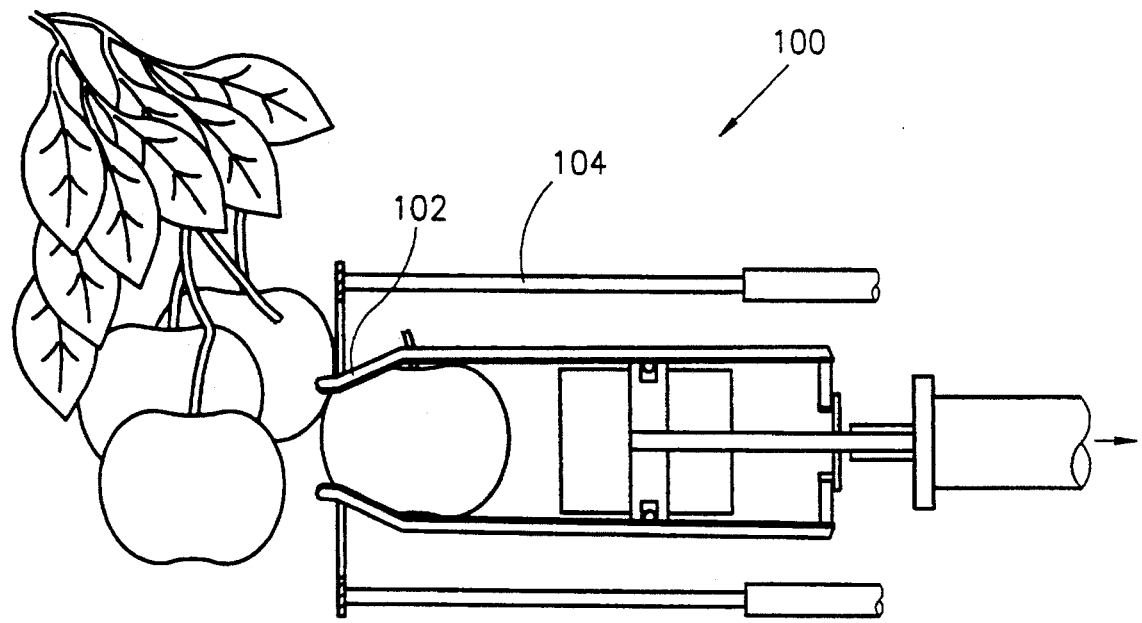
Figure 10G:
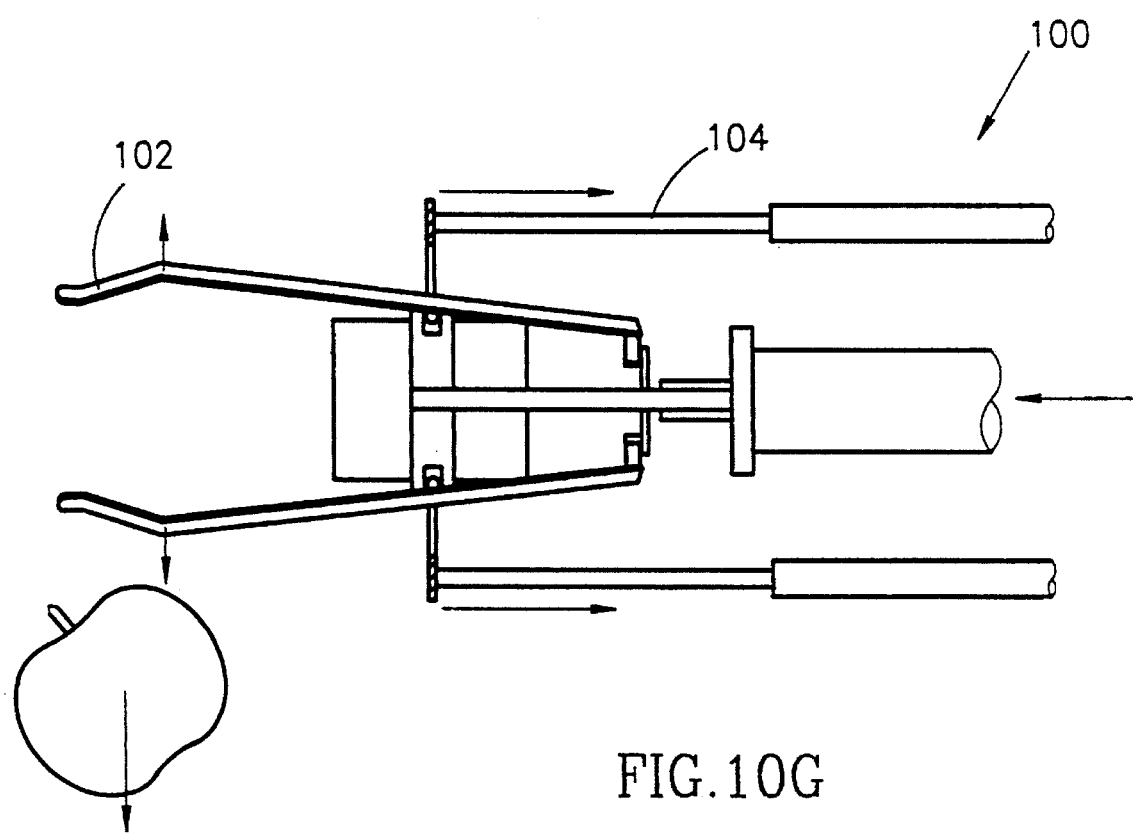

Thereafter, as shown in FIG. 10e, while gripping crop item 16, manipulator 102 is retracted away from its growth source while stabilizer 104 ensures that the growth source is not pulled along with crop item 16. As crop item 16 passes through the aperture in a rearward direction, its stem is broken at its knee as shown in FIG. 10f. After the stem has been broken, manipulator 102 assumes its open arrangement so as to release crop item 16 while stabilizer 104 is preferably also retracted.

While the invention has been described with respect to a limited number of embodiments, it will be appreciated that many variations, modifications and other applications of the invention may be made.

What is claimed is:

1. A system for executing a farming activity on a working area including one or more growing areas of crop items, the system comprising:
   (a) a track extending substantially parallel to and in a spaced relationship from one or more of the growing areas of crop items; and
   (b) a trolley driven along said track, said trolley including farm equipment, a part of said farm equipment being deployable over at least a part of the growing areas of crop items for executing a farming activity on the growing areas of crop items.

2. The system as in claim 1 wherein said track is buried underground.

3. The system as in claim 1 wherein said track is laid on the ground.

4. The system as in claim 1 wherein said track is an overhead track.

5. The system as in claim 1 wherein said track is a permanent fixture in the working area.

6. The system as in claim 1 wherein said track is a portable fixture which can be selectively deployed in one or more working areas.

7. The system as in claim 1 wherein said farm equipment includes:
   (i) an object location apparatus including a camera for determining the location of a crop item relative to a pre-determined point of reference, said camera having an optical center; and
   (ii) a harvesting tool for harvesting a crop item located by said object location apparatus, said tool having an imaginary anchor point, said optical center and said anchor point being substantially coincident in space such that said tool approaches the object along a line of action which is substantially coincident with a line of sight between the object and said optical center.

8. The system as in claim 7 wherein said harvesting tool harvests a crop item hanging by a stem from its growth source, said harvesting tool including:
   (i) a base; and
   (ii) a cutterhead mounted on said base, said cutterhead including an array of at least three fingers for accommodating the stem between a pair of adjacent fingers, said array of fingers having a substantially arcuate configuration and dimensioned so as to envelop at least the top portion of the crop item, and a stem cutter for cutting the stem when accommodated by said pair of adjacent fingers.

9. The system as in claim 7 wherein said harvesting tool harvests a crop item hanging by a stem from its growth source, said harvesting tool including:
   (i) a manipulator for selectively harvesting the crop item, said manipulator detaching the crop item from its growth source during a displacement from an extended position in which said manipulator grips the crop item at its growth source to an retracted position; and
   (ii) a stabilizer for stabilizing the growth source while the crop item is being harvested therefrom, said stabilizer assuming a growth source engaging position before said manipulator is displaced from its said extended position to its retracted position.

10. The system as in claim 7 wherein said farm equipment further includes:
    (iii) cleaning apparatus for cleaning crop items as they descend from a first height to a second height, and
    (iv) sorting apparatus for sorting crop items according to size, said sorting apparatus being deployed either at said first height or said second height.

11. A harvesting tool for harvesting a crop item hanging by a stem from its growth source, the harvesting tool comprising:
    (a) a base;
    (b) a cutterhead mounted on said base, said cutterhead including:
       (i) an array of at least three fingers for accommodating the stem between a pair of adjacent fingers, said array of fingers having a substantially arcuate configuration and dimensioned so as to envelop at least the top portion of the crop item, and
       (ii) a stem cutter for cutting the stem when accommodated by said pair of adjacent fingers; and
    (c) means for activating said cutterhead once the stem has been positioned between said pair of adjacent fingers.

12. The harvesting tool as in claim 11 wherein said cutterhead is rotatably mounted on said base for enabling a selectively variable forward pitch thereof relative to said base so as to capture the stem when inclined away from said cutterhead.

13. The harvesting tool as in claim 11 wherein said stem cutter includes a rotatable cutter movable along a path parallel and in close proximity to said array of fingers.

14. The harvesting tool as in claim 11, said array of fingers being referred to herein as said first array of fingers, wherein said stem cutter includes a second array of at least two fingers, said first array of fingers and said stem cutter having an overlapping portion, said first array of fingers and said stem cutter being displaceable relative to one another between:
    i) a stem accommodating position in which the stem extends between a pair of adjacent fingers of said first array of fingers and a pair of adjacent fingers of said stem cutter, and
    ii) a stem cutting position in which the stem is cut by a shearing action between said first array of fingers and said stem cutter.

15. The harvesting tool as in claim 11 further comprising:
    (c) a first sensor for providing a signal at a first pre-determined distance from a crop item;
    (d) a second sensor for providing a signal at a second pre-determined distance from a crop item, said second pre-determined distance being less than said first pre-determined distance; and
    (e) a third sensor for providing a signal when the stem impacts said cutterhead.

16. A harvesting tool for harvesting a crop item from its growth source, the harvesting tool comprising:
    (a) a manipulator for selectively harvesting the crop item, said manipulator detaching the crop item from its growth source during a displacement from an extended position in which said manipulator grips the crop item at its growth source to an retracted position; and
    (b) a stabilizer for stabilizing the growth source while the crop item is being harvested therefrom, said stabilizer assuming a growth source engaging position before said manipulator is displaced from said extended position to said retracted position.

17. The harvesting tool as in claim 16 wherein said stabilizer has an aperture through which at least a portion of said manipulator extends so as to grip the crop item.

18. The harvesting tool as in claim 16 further comprising:
    (c) a first sensor for providing a signal at a first pre-determined distance from a crop item; and
    (d) a second sensor for providing a signal at a second pre-determined distance from a crop item, said second pre-determined distance being less than said first predetermined distance.

19. The harvesting tool as in claim 16 wherein said manipulator includes:
 (i) a rotatable disc; and
 (ii) at least three fingers, each of said at least three fingers having one end connected to said disc and a free end, said disc having a first position in which said free ends are urged toward one another in a crop gripping position and a second position in which said free ends are urged away from one another in a crop releasing position.

* * * * *